Jan. 30, 1940.  W. E. SCHIRMER  2,188,316
METHOD OF FORMING AXLE HOUSINGS
Filed May 28, 1937  2 Sheets-Sheet 1
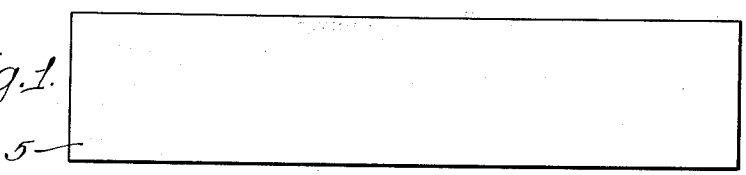
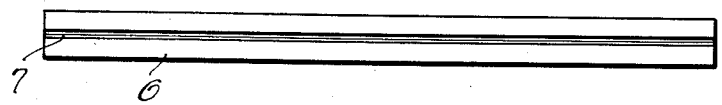
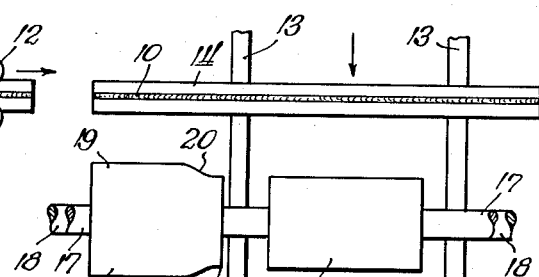
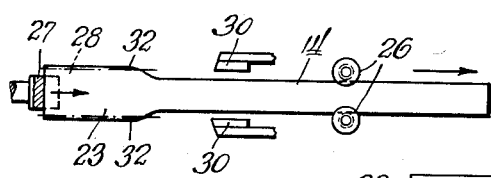
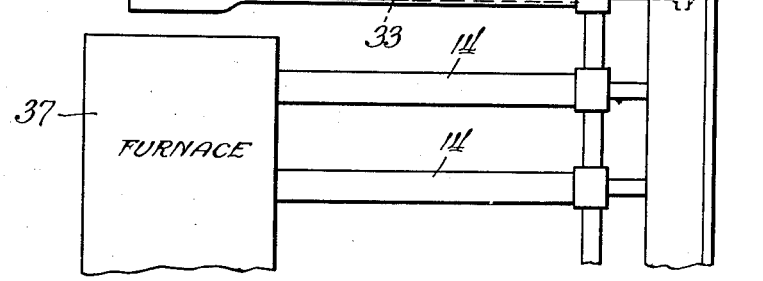
Inventor.
Walter E. Schirmer

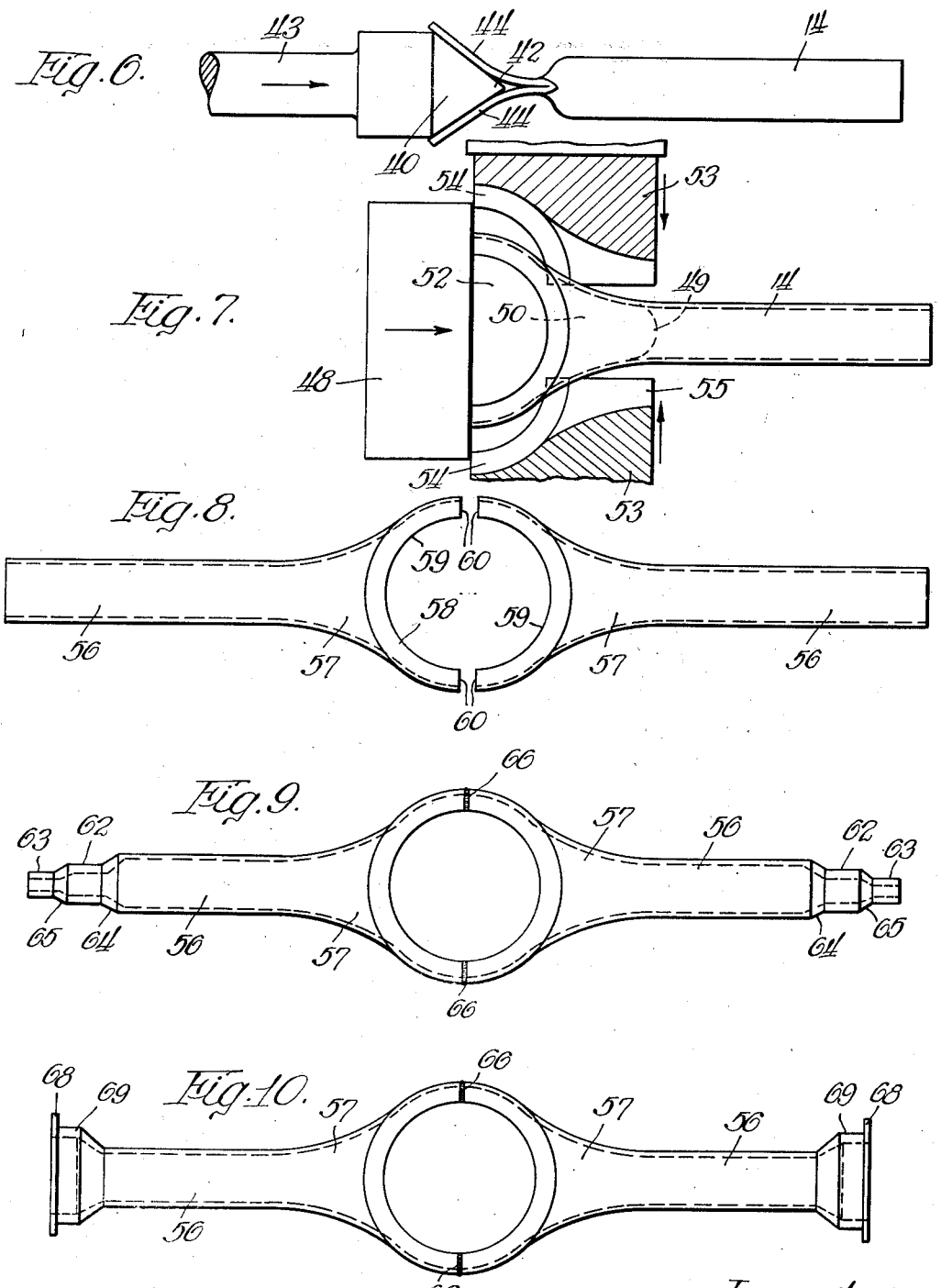

Patented Jan. 30, 1940

2,188,316

UNITED STATES PATENT OFFICE 2,188,316

METHOD OF FORMING AXLE HOUSINGS

Walter E. Schirmer, Niles, Mich., assignor to Clark Equipment Company, Buchanan, Mich., a corporation of Michigan Application May 28, 1937, Serial No. 145,212

12 Claims. (Cl. 29—153.1)

This invention relates to axle housings and a method of forming the same, and more particularly is directed to rear axle housings of the banjo type employed in passenger cars, trucks, busses and the like.

It has been customary heretofore to form such housings from a tubular blank by slotting the central portion, expanding the same to form a banjo casing, and upsetting or swaging the ends of the extending arm portions to produce the desired wheel bearing supports. Certain departures from this practice have involved the pressed steel type of housing in which pressed steel members are preformed and welded together, or in which relatively short tubular blanks are expanded and belled out at one end while the remainder of the tube is swaged or drawn down to the proper diameter and wall thickness, the belled out portion forming a half of a circular banjo frame to which the corresponding end of a second tubular blank is then welded.

The present invention contemplates broadly a more or less continuous process for forming an axle housing from two tubular blanks which may be formed by rolling up flat sheet stock and welding the longitudinal seam thereof. From the welding unit, the blank is passed through suitable rolls which flatten one end thereof and decrease the wall thickness of the flattened end. This produces a lateral enlargement of the flattened end, and the defining edges of this enlargement are then sheared off by suitable means to produce two relatively thin parallel portions which are then expanded outwardly, and at the same time, the defining edges thereof are turned inwardly to form a semi-circular section having parallel radially inwardly directed peripheral flanges. Two such blanks are then welded together to form the complete banjo type housing.

One of the advantages of the present invention resides in the fact that the sheet stock from which the blank is formed may be of such thickness and area that the tubular blank formed therefrom has the proper arm diameter and wall thickness for sustaining the loads and stresses to which the housing may be subjected. This eliminates any swaging, rolling or drawing operations being performed upon the arm portions, which has heretofore been necessary. The cost of producing the housing is therefore materially reduced by the present process.

Another feature of the present invention resides in the method of forming the banjo section of the blank whereby the flattening operation at one end of the blank reduces the thickness of the metal at this end to an extent such that when the flattened end is expanded into the banjo shape, sufficient metal is provided for producing the proper flange depth in the banjo, while at the same time the wall thickness throughout this section is of a thickness sufficient to withstand the stresses to which this portion of the housing is subjected.

Still another advantage of the present invention results from the fact that the blanks may be continuously operated upon from the initial stage of rolling up the flat sheet stock to the final stage of expanding the banjo section and swaging or upsetting the extremities of the arm portion. This is accomplished with a minimum amount of handling and can be carried out substantially entirely by suitably designed machinery so that the operator need not handle the relatively heavy blanks as they pass from one stage of the forming operation to another.

By the proper selection of the sheet stock, therefore, I am enabled to form an axle housing having the proper thickness of metal throughout the various sections thereof, and having the proper arm diameter, without the necessity of performing any swaging, rolling or drawing operations upon the portions of the arms intermediate the banjo section and the extremity of the arm.

Another advantage of the present invention resides in the provision of suitable means whereby the half banjo section and the tapered throat joining this section to the arm constituting the remainder of the blank can be formed simultaneously, eliminating the necessity of separate flanging and throating operations, and this can be accomplished during the time that the metal is at a temperature facilitating its movement into the desired shape.

Still another advantage resulting from the flattening of the end of the blank prior to its expansion into the half banjo section is that the wall thickness is reduced, thus providing an increased surface area of metal, whereby sufficient metal is provided to produce the banjo section without any possibility of tearing of the metal into the throat, which was the disadvantage found in the use of the method disclosed in the Mogford and Spatta patent, No. 1,652,630, of December 13, 1927. At the same time, the decrease in wall thickness is permissible, since this portion of the arm is not subjected to the stresses found in the thicker arm portions.

Other objects and advantages of the present invention will appear more fully from the following detailed description which, taken in conjunction with the accompanying drawings, will disclose to those skilled in the art the particular manner of carrying out my present invention.

In the drawings:

Figure 1 is a plan view of a blank which may be employed in the present invention;

Figure 2 shows the blank of Figure 1 after it has been formed into tubular shape, and prior to the welding operation;

Figure 3 is a sectional view through the blank of Figure 2 taken on line 3—3 of Figure 2;

Figure 4 is a somewhat diagrammatic view showing the welding of the tube and the subsequent rolling operation;

Figure 5 shows the next step in the process of forming the blank;

Figure 6 is a diagrammatic view showing the succeeding step in the blank-forming operation;

Figure 7 shows the blank after the expanding operation which forms the banjo section;

Figure 8 shows the joining of two blanks to form a banjo type housing;

Figure 9 shows one manner in which the extremity of the arm may be formed; and

Figure 10 shows an optional method of finishing the arm.

Referring now in detail to the drawings, I have disclosed in Figure 1 a flat blank formed of steel stock of a thickness such as required in the arm portions of an axle housing, and of a length sufficient to form one half of a banjo type housing. This blank is rectangular in shape and is indicated generally by the reference numeral 5.

In carrying out the present invention the blanks 5 are successively fed through suitable rolling mills to form them into tubular form, such as shown at 6 in Figure 2, having a V-shaped cleft 7 formed by the abutting edges, and from the rolling mill the blanks 6 are fed through a suitable welding unit 8 by means of the feed rolls. In this unit, the two edges are welded together by a fusion weld or the like, and in a preferred form of the invention I employ an atomic hydrogen welding unit for this purpose to produce the longitudinal seam weld 10. Suitable rolls are provided in conjunction with the welding unit to force the edges together under pressure, and if desired, additional rolls may be employed for smoothing out the welded junction.

From the unit 8 the rolls 12 feed the welded blanks to a rack comprising the parallel track members 13 which receive the welded blank 14 and guide it toward the pairs of cooperating roll members 15 and 16 mounted upon vertically spaced shafts 17 and 18. The rolls 16 are guide and supporting rolls which hold the cylindrical portion of the blank during the rolling operation performed by the cooperating pair of rolls 15. It will be noted that the rolls 15 are provided with a cylindrical portion 19 of increased diameter with respect to the rolls 16, and having a tapered substantially frusto-conical portion 20 merging into the cylindrical portion 22 which is of the same diameter as the rolls 16.

As a result, the blank 14, when passed through the rolls 15 and 16, has one end thereof flattened as indicated at 23, the flattened end being defined by wall sections which are increased in lateral area and decreased in wall thickness. The flattened portion 23 of the blank is joined to the tubular portion 14 by means of the intermediate tapered portion 24. Preferably, the blank is flattened so that the longitudinal welded seam 10 is disposed centrally along one side of the flattened portion.

After the flattening operation, suitable pusher means, indicated by the arrow in Figure 4, forces the blank between a pair of feed rolls 25 which pull the blank laterally from the rack 13 and guide it between a second pair of rolls 26 shown in Figure 5, the rolls 26 being assisted by a plunger member 27 having a bifurcated end 28 which aligns the blank 14 within the rolls 26, and assists in moving the blank toward the shear blades 30. These blades are so positioned with respect to the longitudinally defining edges 32 of the flattened portion of the blank that as the blank moves therepast, these edges are sheared off thereby providing two flat wall sections which are connected by the folded portion of the blank which formed the edges 32. The rolls 26 carry the blank into position upon suitable mandrel means 33 connected together on an endless conveyor or belt mechanism 34, suitably supported as by the rolls 35 upon a guide rail 36, and the blanks with the edges sheared off are carried by the mandrels 33 into the furnace indicated generally at 37. The blanks are so disposed with respect to the furnace that the flattened ends 23 thereof are heated to a forging temperature for the banjo forming operation.

From the furnace the blanks are carried to suitable mechanism such as shown in Figure 6 whereby the blank 14 is held against longitudinal movement, and a spreader die 40 having the pointed nose portion 42 is moved axially of the blank by means of the plunger 43 operated hydraulically or in any other suitable manner to spread apart the two flat wall sections 44 into the shape shown generally in Figure 6. This produces the initial spreading or expanding operation, and opens up the end of the blank to facilitate the final banjo forming operation shown in Figure 7.

The blank, after the wall sections 44 have been spread apart, is suitably positioned in a guide holder which rigidly supports the tubular portion 14 of the blank, and the male die member 48 is then forced into the spread end of the blank. This die member consists of a substantially cylindrical nose portion 49, a tapered intermediate portion 50 which is of circular section adjacent the nose portion 49, and is of oval section increasing in its major dimension to the transversely disposed semi-cylindrical portion 52 of the die member which is of rectangular cross section and increases in its longitudinal extent up to the supporting portion of the die member 48. When the male die member 48 has been moved to the position shown in Figure 7 by means of a suitable ram, either mechanically or hydraulically actuated, it is held in this position while the two cooperating die members 53 are moved normal to the die member 48 and toward the blank 14. Each of the die members 53 has a first die portion 54 which forms the radially inwardly extending defining flanges of the banjo by folding over the lateral edges of the wall sections 44 of the blank onto the surface of the portion 52 of the die 48. The dies 53 also have the throat forming portions 55 which are shaped to cooperate with the intermediate portion 50 of the die member 48 to move metal inwardly about the surface of the die member 50, thereby forming a smooth junction between the cylindrical section formed by the portions 52 and 54 of the die members 48 and 53 and the cylindrical section of the remainder of the blank 14. Thus, the movement of the die members 53 toward each other completes the formation of the half banjo section with the defining flanges, and also forms the smooth tapered throat section which joins the half banjo section to the cylindrical portion of the blank.

The blank, after leaving the dies shown in Figure 7, is of the form shown in Figure 8 comprising the tubular arm portions 56, the throat portions 57 and the half banjo sections 58 having the defining parallel radially inwardly extending flanges 59. Two such sections may then be joined at the meeting edges of the banjo sections indicated at 60 in Figure 8 by a fusion weld, flash welding or the like.

However, I preferably swage down the outer ends of the arm portions 56 prior to joining the two sections at the edges 60. The operations on the outer extremities of the arm portions may consist of swaging operations which produce an end formation such as shown in Figure 9. This construction is for a full floating type of axle housing in which the ends of the arms have been increased in wall thickness and decreased in diameter to form the bearing seat portions 62 and 63 for receiving the bearings of a suitable wheel member, and which are joined through the respective frusto-conical sections 64 and 65 to the arm portions of the housing. The two housing sections so formed are then joined together by the welded junctions 66 as indicated in Figure 9. If it is desired to form a passenger car type of axle housing, the extremities of the arm portions 56 are subjected to endwise upsetting operations, preferably in three or four stages, which produce the thickened radially extending flange 68 joined to the arm portion 56 through the enlarged annular bearing seat portions 69. The blanks are then joined together at the junctions 66 as previously described. It is of course obvious that the end forming operations may occur after the blanks have been joined together to complete the housing structure instead of being formed at the ends of the individual blanks prior to joining the two blanks together.

It is also to be understood that for certain types of housings of light weight construction, it may not be necessary to heat the flattened ends 23 of the blanks 14 prior to the banjo forming operation, although this is desirable in heavier housings for trucks and busses.

By selecting sheet stock of the proper wall thickness that is required for the arm portions of the housing and which is of dimensions suitable to produce the desired diameter for the arm portions, I am able to eliminate any swaging or drawing operations for reducing these arm sections. Also, by reason of the flattening operation on the end of the blank, the wall thickness of this portion of the blank is reduced while the lateral surface area is increased, whereby sufficient metal is available for producing the expanded banjo section, and the wall thickness still remains sufficient for the stresses imposed upon this section of the housing, which are substantially less than the stresses in the arm portions and outer extremities of the housing. The use of dies of the form shown in Figure 7 enables the formation of the half banjo section and throat in a single operation, which eliminates the throating operations heretofore found necessary in housings of this type.

It will also be noted that the operations from the forming of the tubular blank to the forming of the banjo sections can be conducted in a continuous sequence, thus facilitating high speed production of housings of this type as a continuing cycle of operations. The movement of the blank can be controlled substantially automatically by means of suitable rolls and feed mechanisms through the forming mill, the welding unit, the flattening rolls, the shearing mechanism and the end heating operations so that a minimum amount of labor is expended in producing the housing.

While the invention has been described in connection with the formation of the blanks from flat sheet stock, it is obvious that seamless or drawn tubing may be employed, in which case the tube forming and welding operations are eliminated and the blanks are initially subjected to the flattening operation shown in Figure 4.

I am aware that various changes in the apparatus employed and in details of the particular process described may be made without departing from the underlying method of operation or apparatus illustrating the preferred form of the present invention. I therefore do not intend to be limited except as defined by the scope and spirit of the appended claims.

I claim:

1. The method of forming an axle housing which comprises providing a tubular blank, rolling one end of said blank to flatten the same and thereby increase its lateral surface and simultaneously decrease its wall thickness, shearing off the edges of the flattened end, spreading the walls of said flattened end apart to form a semi-cylindrical banjo frame section disposed with its axis normal to the axis of the blank, welding the sections of two such blanks together, and upsetting the opposite ends of such blanks to produce an axle housing of the banjo type.

2. A continuous process for forming axle housing parts which comprises rolling sheet stock into tubular form, passing said tubular blank through a longitudinal seam welding device, moving the welded blank transversely through rolls to flatten one end thereof, then moving said blank longitudinally and shearing off the defining lateral edges at said flattened end, moving said blank transversely to pass said end through a furnace, passing a die between the walls of said flattened end to spread said walls apart in a transverse direction, and die forming said open end into a half banjo frame section joined to the remainder of said blank by a smooth tapered throat portion.

3. In the method of forming an axle housing arm, the novel procedure which comprises rolling one end of a tubular blank to flatten the same and increase its lateral surface and decrease its wall thickness, shearing off the lateral defining edges of the flattened end, and forging said flattened end into a half banjo frame section having a frusto-conical throat joining said section to the remainder of said blank.

4. In the method of forming a housing arm, the novel procedure comprising rolling one end of a tubular blank into flat parallel walls, shearing off the defining edges of said flattened walls, passing a die between said flattened walls to spread said walls transversely apart, and folding over the edge portions of said end while simultaneously forcing metal outwardly into a substantially semi-cylindrical portion to form a banjo frame section having parallel radially inwardly directed side flanges.

5. The method of forming a half banjo section on the end of a tubular blank which comprises transversely rolling one end of said blank to decrease the wall thickness and increase the surface area of metal at said end, and then passing a die longitudinally between the walls of said end and simultaneously forcing dies transversely over the external surfaces of said end walls to form a semi-cylindrical banjo section having its axis disposed at right angles to the axis of said blank.

6. The method of forming a half of a rear axle housing which comprises rolling one end of a tubular blank flat, shearing off the longitudinal defining edges of the flattened portion, supporting said blank on a mandrel with said flattened end projecting, continuously moving said mandrel transversely for passing said end through a furnace to heat the same, and forging and die forming the end transversely of said edges to form a half banjo section while simultaneously folding said edges in radially to form parallel defining flanges.

7. The method of claim 4 further characterized by simultaneously pushing wall sections of the throat between said banjo section and said blank inwardly to form a smooth junction between the flange face of said section and the blank and pushing other wall sections outwardly to form a smooth junction between the banjo web surface and the cylindrical section of said blank.

8. The method of forming a rear axle housing arm which comprises transversely rolling the end of a tubular blank into a flattened section to increase the lateral surface thereof and to decrease its wall thickness, shearing off the edges of said section, punching the walls of said end apart, die forming said end transversely of the blank into a half banjo section, and thickening the wall at the opposite end of said blank to receive wheel bearings.

9. The method of forming a rear axle housing arm which comprises transversely rolling the end of a tubular blank into a flattened section to increase the lateral surface thereof and to decrease its wall thickness, shearing off the edges of said section, punching the walls of said end apart, die forming said end transversely of the blank into a half banjo section, and swaging the opposite end of said blank to reduce its diameter and increase its wall thickness.

10. The method of forming a rear axle housing arm which comprises transversely rolling the end of a tubular blank into a flattened section to increase the lateral surface thereof and to decrease its wall thickness, shearing off the edges of said section, punching the walls of said end apart, die forming said end transversely of the blank into a half banjo section, and endwise upsetting the opposite end of said blank to form a thickened radial flange joined to said blank by an enlarged annular bearing seat portion.

11. The method of forming a rear axle housing of the banjo type which comprises producing a tubular blank having a wall thickness and diameter such as required in the arm portion of the housing, transversely rolling one end of said blank into a flattened portion to decrease its wall thickness and to increase its surface area, shearing the longitudinal edges of said flattened portion, spreading the walls of said flattened portion into diverging positions, forging said spread portion transversely of said blank into a half banjo section having its axis normal to the axis of the blank and joined thereto by a smooth tapered throat portion, thickening the wall at the opposite end of the blank to receive wheel bearings, and welding the half banjo portions of two such blanks together to complete the housing.

12. A continuous process for making an axle housing arm comprising transversely rolling the end of a tubular blank into a flattened section of decreased wall thickness and increased surface area, shearing off the longitudinal edges of the flattened section, supporting said sheared blank upon a transversely moving mandrel to pass the flattened section thereof through a furnace, heating said section in said furnace, punching the walls of said flattened section while heated apart, die forming said walls to form a semi-cylindrical half banjo section on the end of said blank, and forging the opposite end of the blank to form wheel bearing seats thereon.

WALTER E. SCHIRMER.